United States Patent [19]
Tseng et al.

[11] Patent Number: 5,724,094
[45] Date of Patent: Mar. 3, 1998

[54] CONTACT IMAGE SENSOR UTILIZING DIFFERENTIAL VOLTAGE PICKOFF

[75] Inventors: Hsin-Fu Tseng, Los Altos; Weng-Lyang Wang, Saratoga, both of Calif.

[73] Assignee: ScanVision, San Jose, Calif.

[21] Appl. No.: 532,926

[22] Filed: Sep. 22, 1995

[51] Int. Cl.⁶ .............................. H04N 5/335; H04N 9/64
[52] U.S. Cl. ............................... 348/243; 345/245
[58] Field of Search ........................ 348/241, 243, 348/245, 248, 251, 302, 303, 304, 308; 358/482, 483, 463; H04N 5/335, 9/64

[56] References Cited

U.S. PATENT DOCUMENTS

| | | | |
|---|---|---|---|
| 3,949,162 | 4/1976 | Malueg | 178/7.1 |
| 4,916,307 | 4/1990 | Nishibe et al. | 348/245 |
| 5,268,764 | 12/1993 | Kihara et al. | 348/245 |
| 5,268,765 | 12/1993 | Yamashita | 348/243 |

*Primary Examiner*—Andrew Faile
*Assistant Examiner*—Tuan V. Ho

[57] ABSTRACT

A contact image sensing system that eliminates the use of npn phototransistors. The device comprises a plurality of sensing elements, a like number of dummy sensing elements, control and drive clocks, a digital scanning shift register, and a differential amplifier. The device operates by sequentially reading the voltage output of the sensors, then comparing that output with the output of the dummy sensors so that any noise or offset in the signal can be cancelled by a differential amplifier.

9 Claims, 13 Drawing Sheets

CONTACT IMAGE SENSOR UTILIZING DIFFERENTIAL VOLTAGE PICKOFF

FIELD OF THE INVENTION

The present invention relates generally to image sensing arrays to scan documents, and more particularly is a linearly butted array of contact image sensors utilizing differential voltage pickoff.

BACKGROUND OF THE INVENTION

The technology required to scan documents has existed for approximately twenty years. Historically, linear image sensor arrays, in the form of charge-coupled devices (CCD's) or self-scanned photo diode arrays (or MOS), were used to accomplish the scanning. The prior art scanning devices require three essential elements to capture a subject document image: (1) a light source to illuminate the document, (2) an image sensing means, and (3) a lens system to focus the image of the document on the image sensor.

Figure 1:
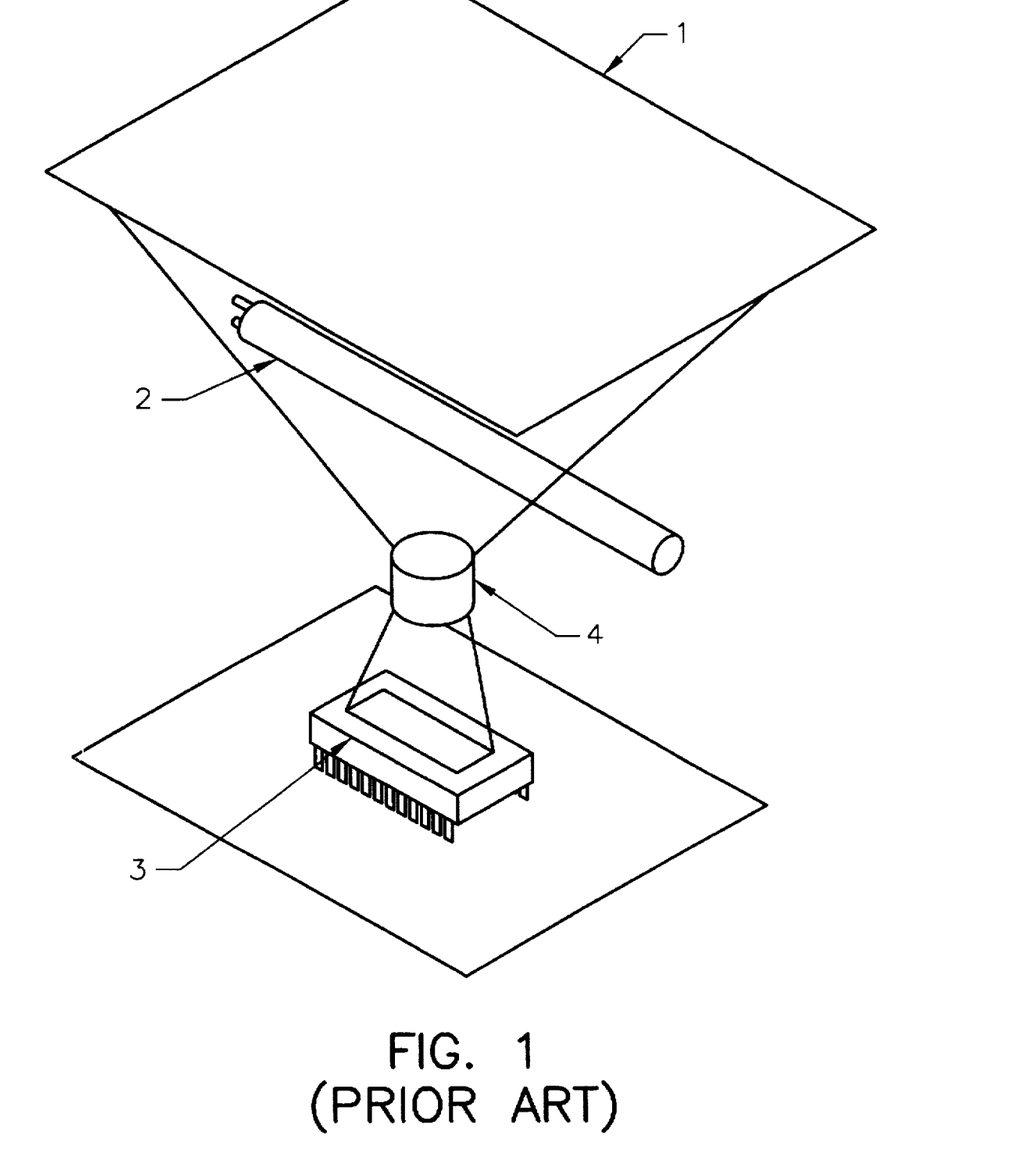
FIG. 1 is a schematic diagram of a prior art CCD scanning device.

A typical configuration for a scanning device (a lens reduction image sensor system) is illustrated in FIG. 1. An original document 1 is illuminated by a light source 2. Since a CCD image sensor 3 is typically approximately one inch long, an optical lens 4 is required to reduce the image of the text on the document 1 so that a full width image can be received in the CCD image sensor 3.

In addition, a distance of 10-30 cm is required between the CCD image sensor 3 and the document 1. This necessitates a rather bulky assembly for the scanning device. For this reason, some prior art devices use sophisticated (hence expensive and difficult to manufacture) folded optical schemes to reduce the total size of the assembly.

Figure 2:
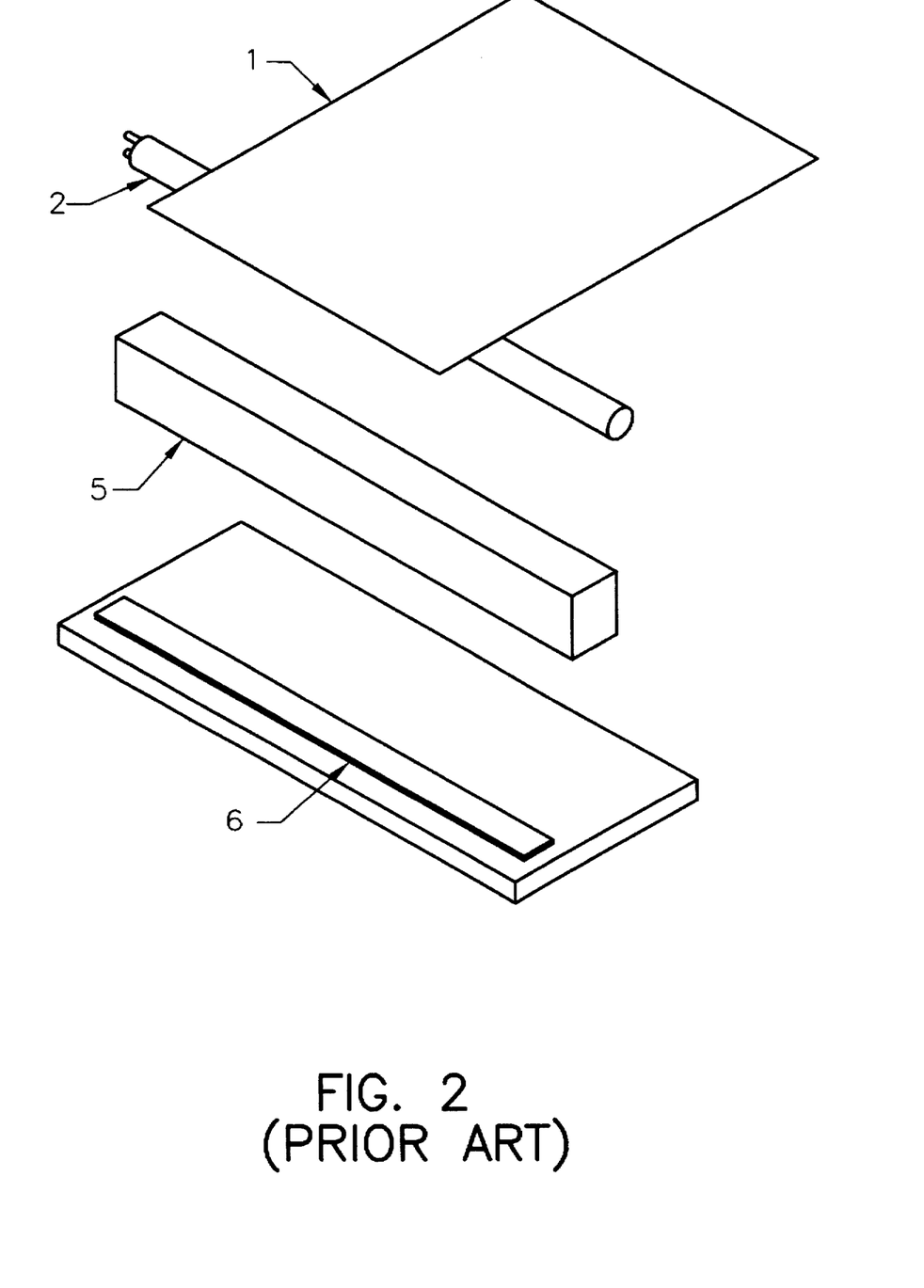
FIG. 2 is a schematic diagram of a more current prior art CIS scanning device.

An improvement on the system shown in FIG. 1 is shown in FIG. 2. FIG. 2 depicts a contact image sensor (CIS) system. In this device the optical system is replaced with a rod lens system 5. This allows one-to-one scanning of the document due to the fact that the rod lens 5 and a hybrid image sensor chip 6 are of the same width as (or greater width than) the document to be scanned. This arrangement allows the distance between the image sensor and the document being scanned to be reduced to approximately 2 cm.

Figure 3:
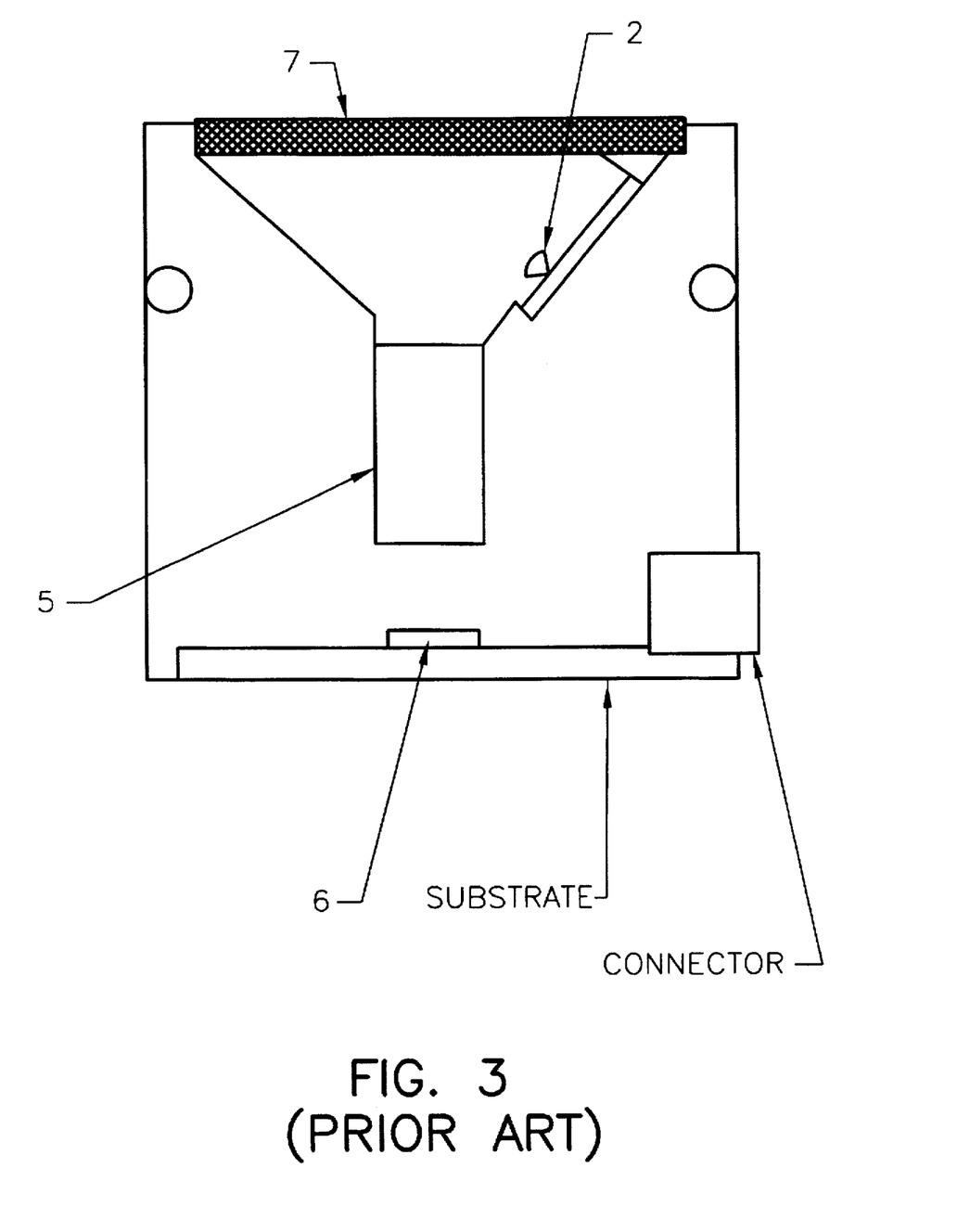
FIG. 3 is a cross section of a current art CIS scanning device.
Figure 4:
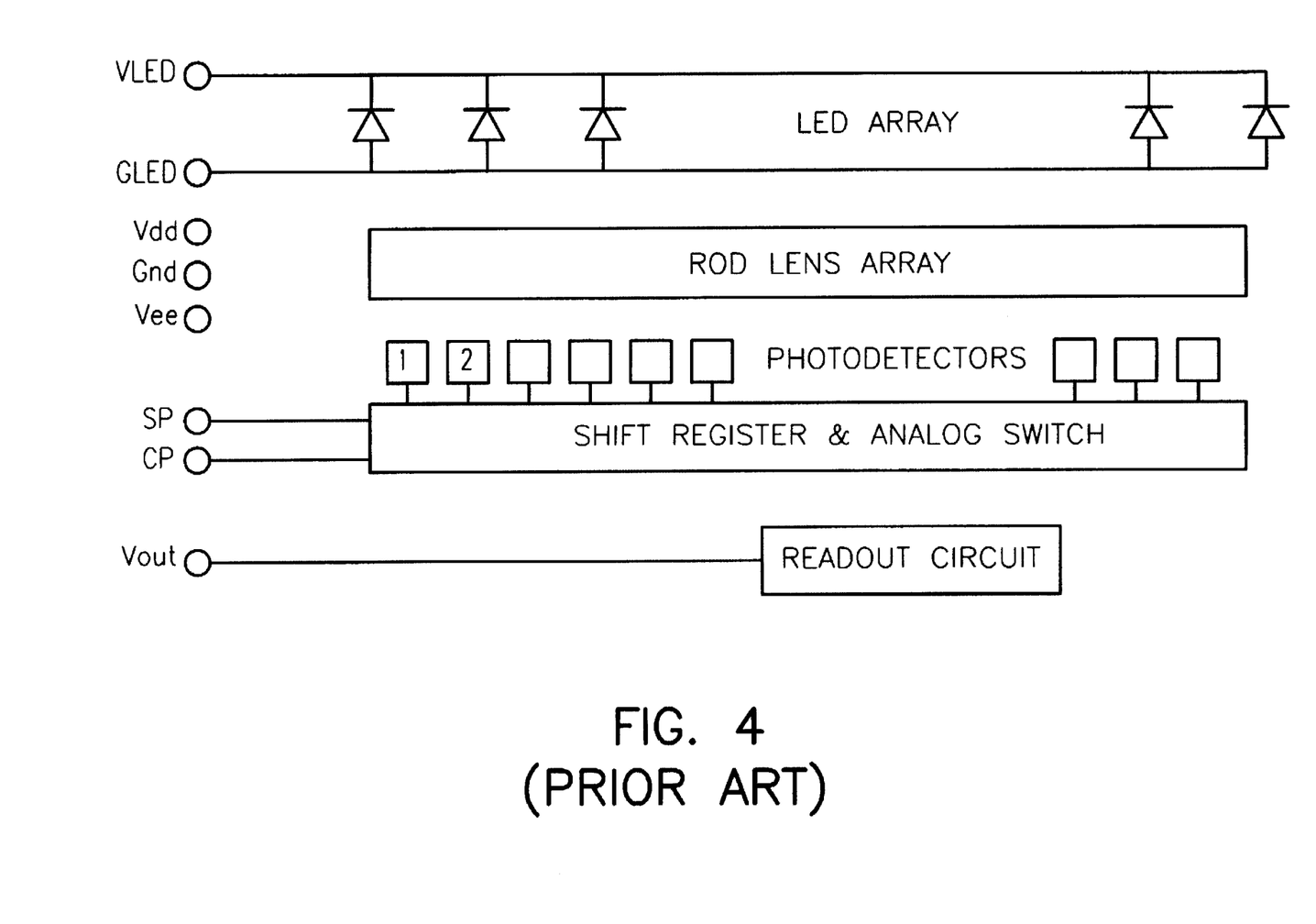
FIG. 4 is a schematic of the circuitry of the prior art CIS scanning device.

A cross section of a current art imaging system utilizing the hybrid image sensor chip 6 is shown in FIG. 3. FIG. 3 depicts the arrangement of the components within a housing with a cover glass 7 to receive documents. FIG. 4 is a block diagram of such an imaging system.

Figure 5:
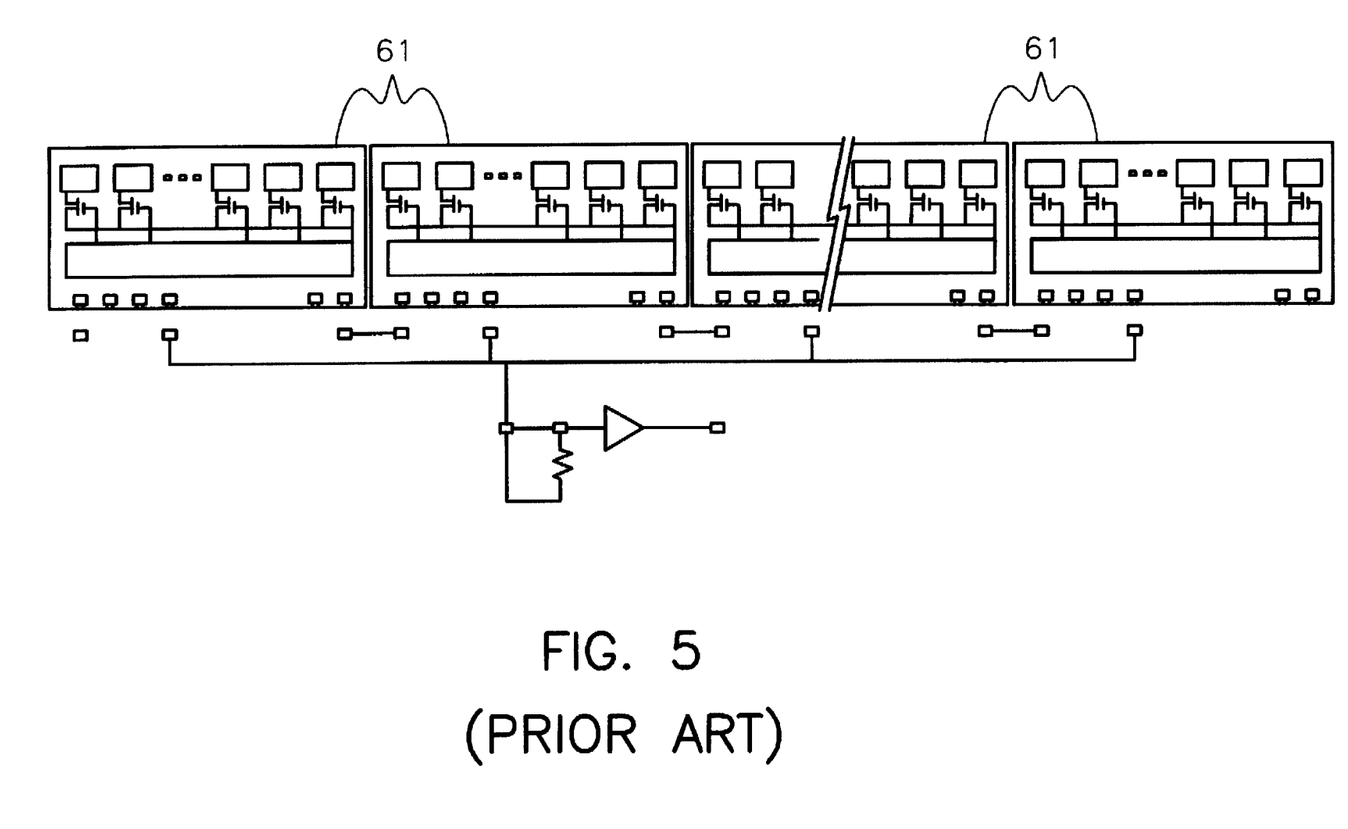
FIG. 5 is a schematic of the hybrid sensor chip of the prior art CIS scanning device.

FIG. 5 shows some detail of the construction of the current art hybrid image sensor chip 6. In this chip, a plurality of individual sensor chips 61 are butted end-to-end on a single substrate. The number of individual chips chosen is dependent upon the desired width of scanning. The hybrid sensor chip 6 also contains signal processing means to serially activate the individual chips and to process the outputs.

Figure 6:
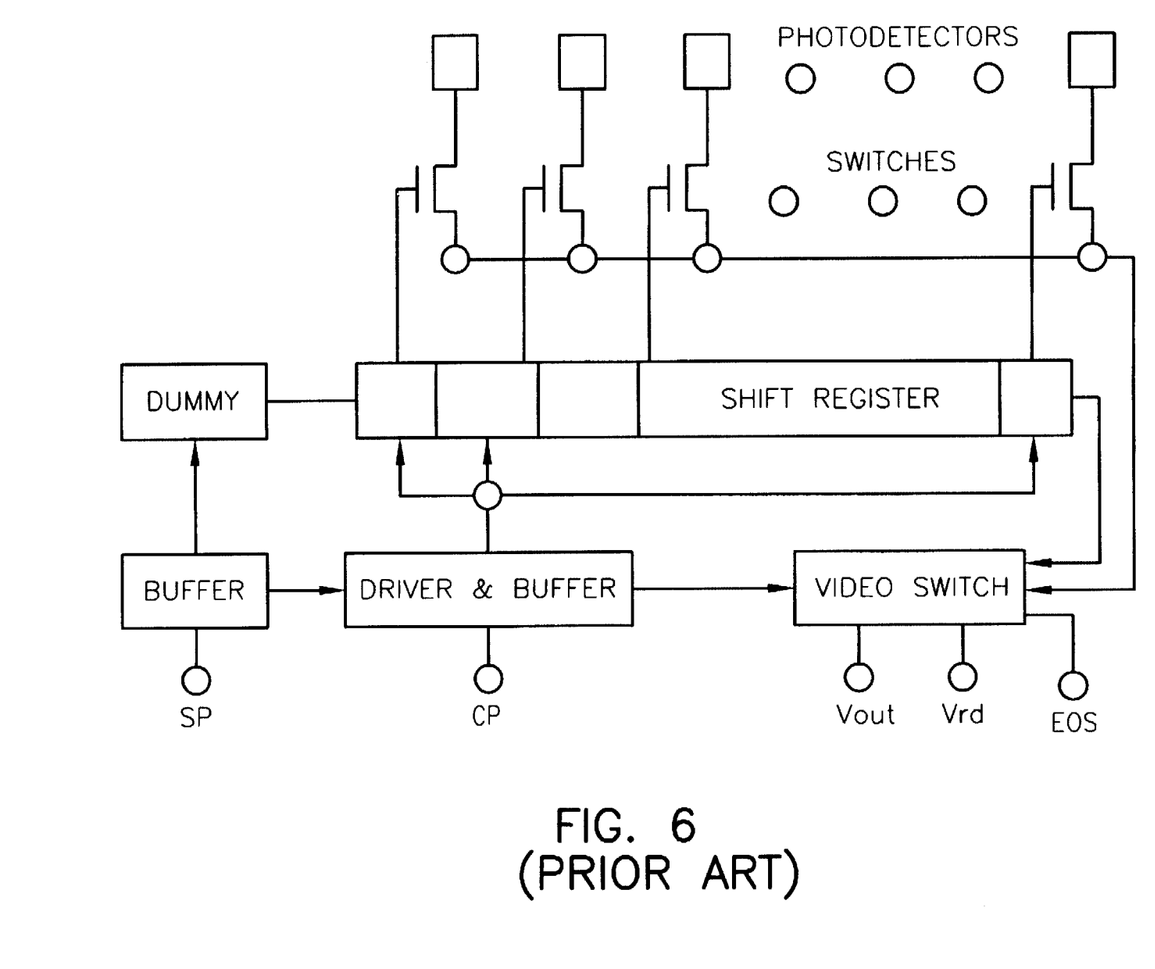
FIG. 6 is a block diagram of the current art CIS device.

A block diagram illustrating the function of the current art individual sensor chip 61 is shown in FIG. 6. (The structure and function of this chip is described in detail in U.S. Pat. No. 5,299,013, issued Mar. 39, 1994.) The individual sensor chip 61 comprises an array of photodetectors, an array of multiplexing switches, a dummy cell, a shift register, a built-in buffer, and a chip selector. In operation, the sensor chip 6 is triggered by a start pulse to the first in sequence individual sensor chip 61 which serially activates the photodetectors on the first individual sensor chip 61. After the signal from the last photodetector element of the first individual sensor chip 61 is read, an end of scan pulse is generated so that the next sensor chip in sequence is triggered.

Figure 7:
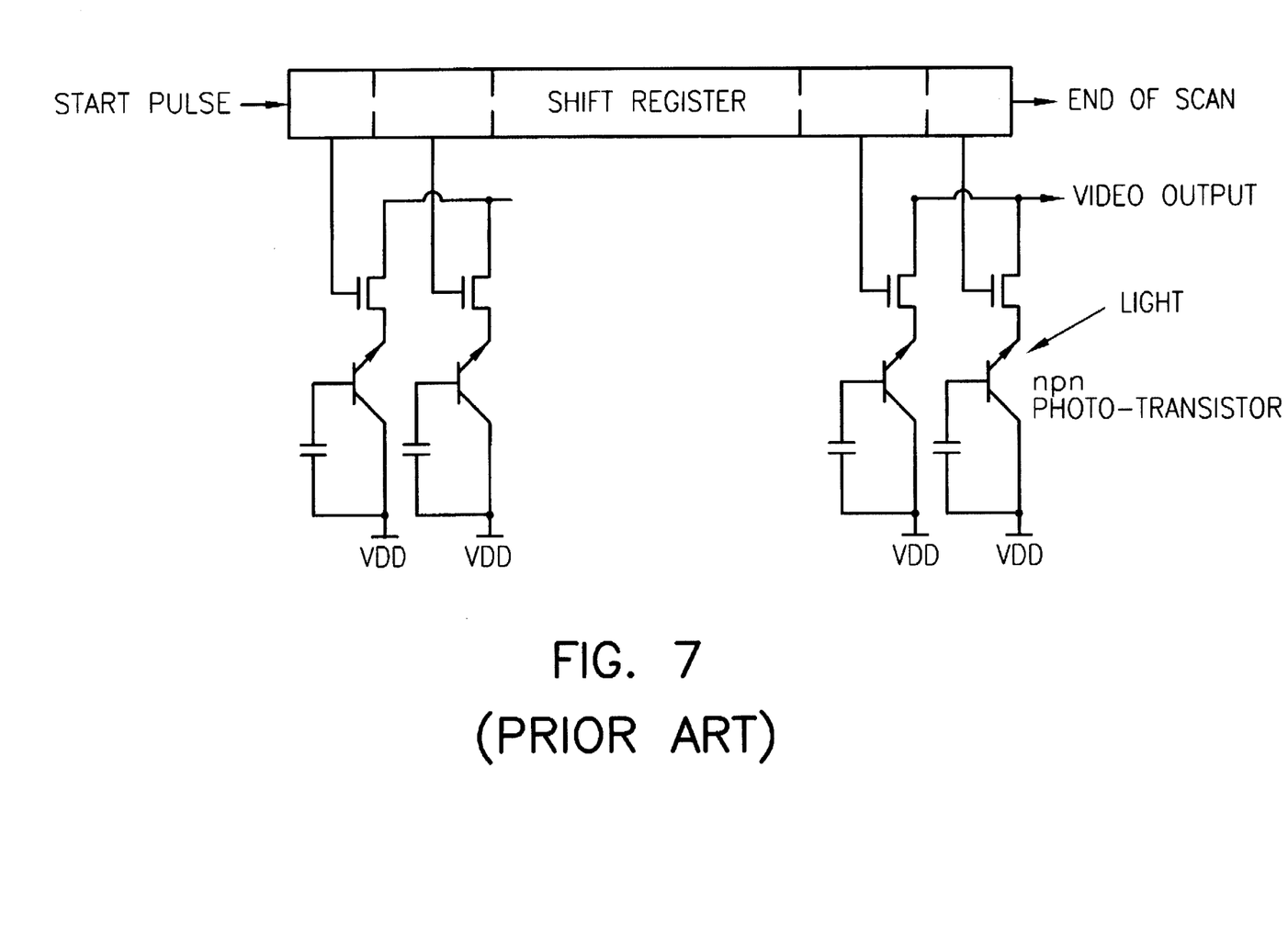
FIG. 7 is a circuit diagram showing the npn phototransistors used in the current art CIS.

The individual sensor chips 61 of the prior art devices utilize npn phototransistors as the sensing elements, as illustrated in the circuit diagram shown in FIG. 7. The npn phototransistors provide gain for the detected light signal, and thus improve the photosensitivity of the device. However, phototransistors are subject to several inherent shortcomings. The gain provided is not linear, being proportionately higher at low signal strengths and lower at higher signal strengths. This nonlinearity can be a significant problem in certain applications, such as those requiring differentiation of gray scales.

Further, the gain from the phototransistors is not uniform. The base of an npn phototransistor is formed by ion implantation. There is typically a ±5% non-uniformity across a wafer subjected to ion implantation. This non-uniformity results in a current gain variation of ±30% across the wafer. The non-uniformity of the gain yields a non-uniformity of the photoresponse of the same magnitude.

A still further drawback to the current art phototransistors is the problem of low light level thresholding due to emitter offset. Before the output current can flow through the phototransistor, the current must first overcome the emitter junction forward bias voltage. This results in light signals of low intensity not being sensed by the phototransistor. This problem is most significant in color scanning applications.

Another shortcoming in sensor chips utilizing npn phototransistors is a reduction in sensitivity for high density arrays. The phototransistors' sensitivity is proportional to its sensing area. As array density increases, the sensing area of the individual phototransistors is decreased drastically, and thus the sensitivity is likewise decreased.

A final shortcoming in the prior art devices is that they require the use of the BICMOS process for manufacturing due to the utilization of the phototransistor sensing elements. This process is more complicated than the standard CMOS process.

OBJECTS, SUMMARY, AND ADVANTAGES OF THE INVENTION

Accordingly, it is an object of the present invention to provide a CIS that does not require the use of npn phototransistors.

It is a further object of the present invention to provide a CIS that can be manufactured with standard MOS technologies.

It is a still further object of the present invention to provide a CIS that can be used for color and gray scale sensitive applications.

In summary, the present invention is a contact image sensing system that eliminates the use of npn phototransistors. The device comprises a plurality of sensing elements, a like number of dummy sensing elements, control and drive clocks, a digital scanning shift register, and a differential amplifier. The device operates by sequentially reading the voltage output of the sensors, then comparing that output with the output of the dummy sensors so that any noise or offset in the signal can be cancelled by a differential amplifier.

An advantage of the present invention is that it detects voltage levels as opposed to current generated by the reflected light.

Another advantage of the present invention is that it eliminates the use of phototransistors in the CIS sensor chip.

Another advantage of the present invention is that the sensitivity of the sensing elements is independent of detector size, and as a result, very high density CIS sensor chip arrays with very high sensitivity can be realized.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 8:
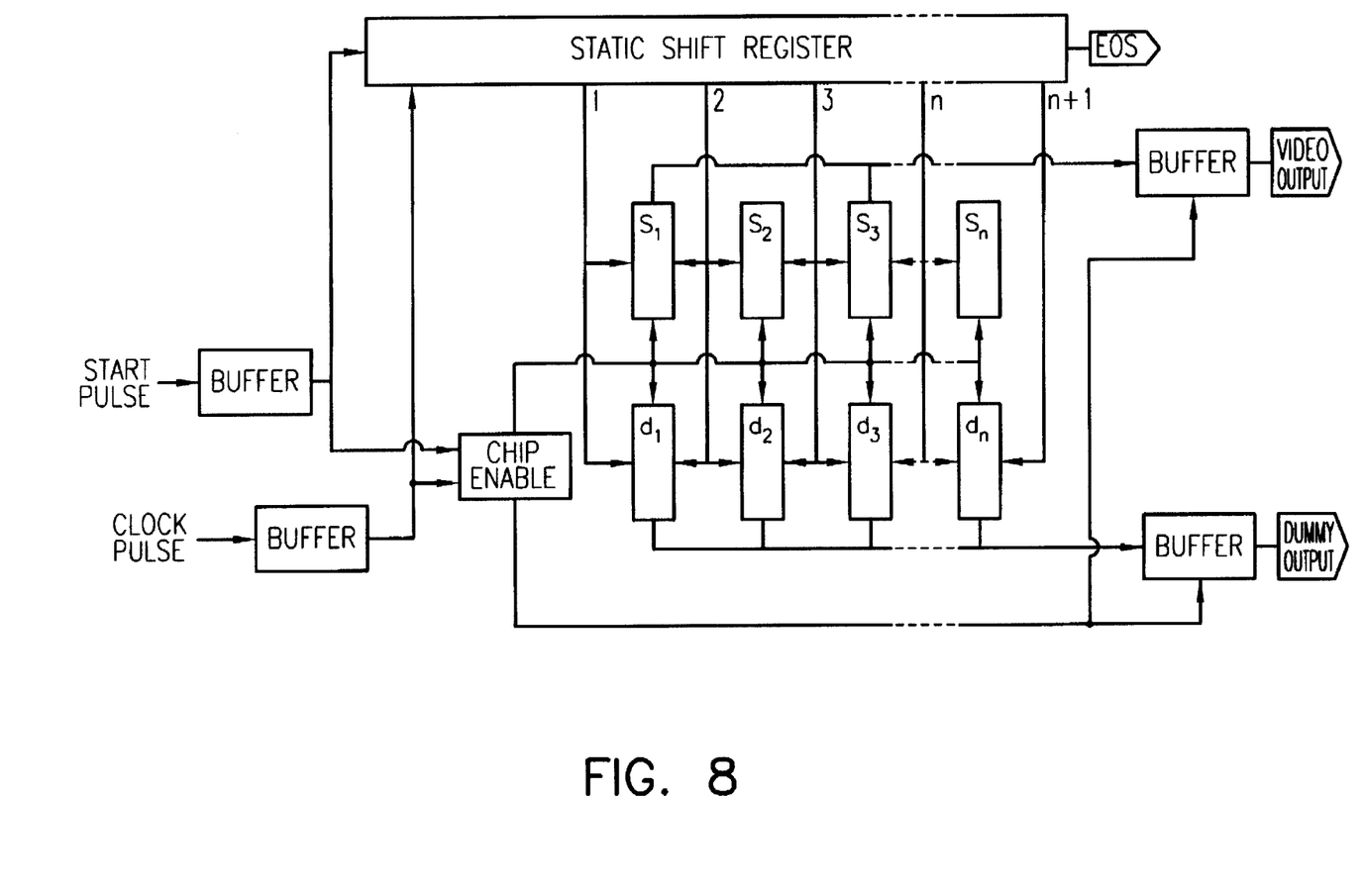
FIG. 8 is a block diagram of the present invention.

Referring first to FIG. 8, the present invention is a CIS circuit utilizing differential voltage pickoff. The circuit comprises chiefly a plurality of sensing elements denoted throughout the drawings as $S_1$ through $S_n$. (The construction of the sensors will be described in further detail below following the description of the circuit in general.) The circuit also includes a like number of dummy sensors, labelled $d_1$ through $d_n$. Control and drive clocks are also included to control the timing and scan advance of the circuit. The circuit further includes a digital scanning shift register and two buffer amplifiers which scrub the signal before output.

Sensing elements $S_1$ through $S_n$ provide a video output signal by means of a multiplexer switch through the buffer amplifier. (The amplifier serves as a buffer to drive the video line capacitance of the hybrid sensor chip.) The shift register sequentially activates each of the sensing elements $S_1$ through $S_n$. As each sensor S is activated, its signal is read and transmitted to the amplifier. As sensor $S_2$ is being read, sensor $S_1$ is reset to the dark level by the shift register. Since the sensors are grouped with multiple chips butted end-to-end, when the signal from the last sensor on a chip is read, the shift register produces an end of scan (EOS) signal which is received by the first sensor on the next chip in sequence as a start pulse. In this manner, only one start pulse needs to be generated by the circuit's clock, regardless of how many sensor chips are utilized.

Figure 10:
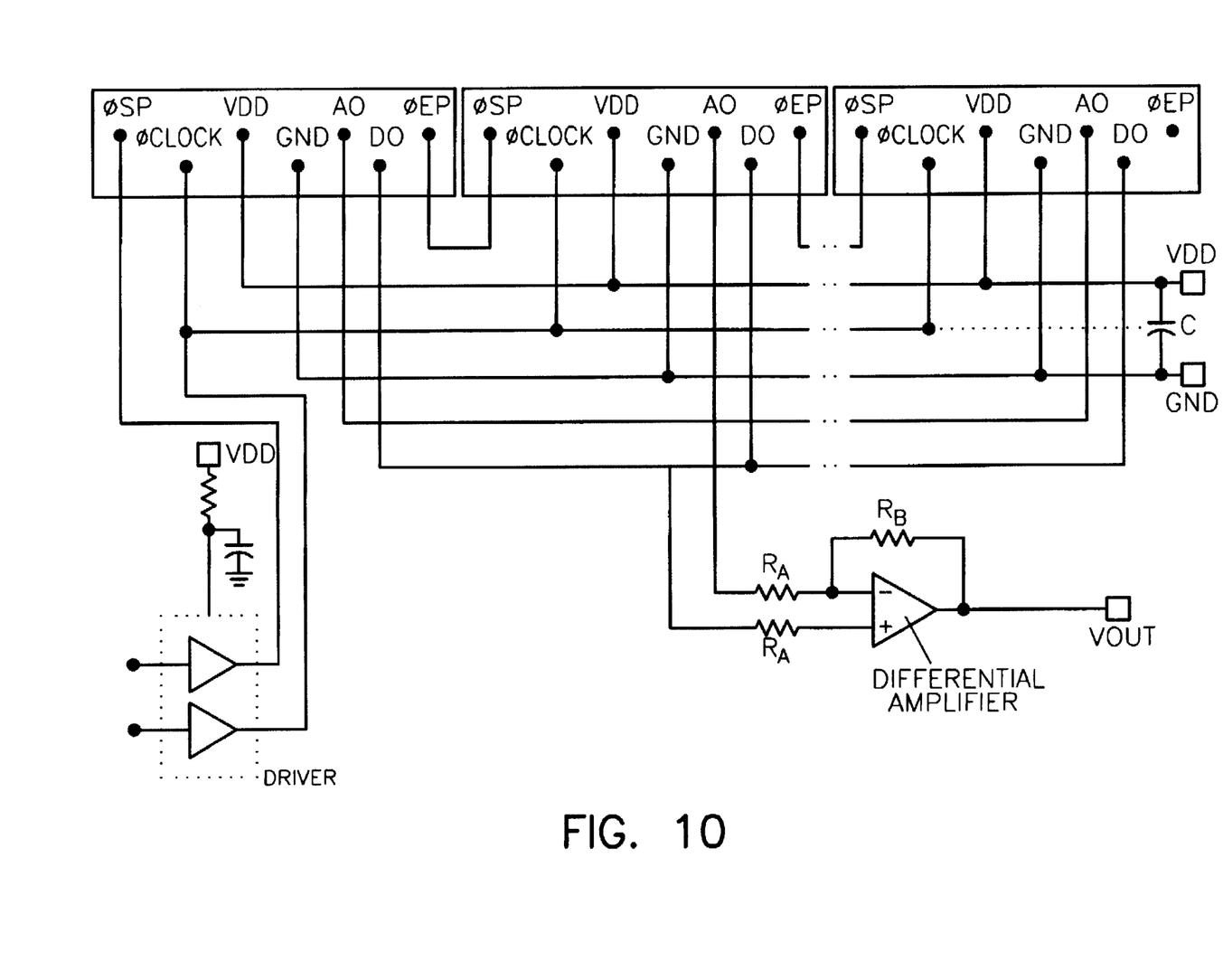
FIG. 10 depicts the sensor chips as installed in the hybrid device.

The dummy sensors $d_1$ through $d_n$ function in the same manner as the sensors $S_1$ through $S_n$. However, the dummy sensors are shielded by some blocking means, generally simply a metal plate, so that they receive no light. The output of the dummy sensors will therefore not vary with the images on the subject document. The dummy sensors $d_1$ through $d_n$ therefore provide a baseline signal that is used to cancel any dark fixed pattern noise or DC offset voltage from the signal from the sensors $S_1$ through $S_n$. This scrubbing of the output signal is accomplished in the differential amplifiers, as shown in FIG. 10.

In practice, the pairs of active sensors $S_1$ through $S_n$, and their respective dummy sensors $D_1$ through $D_n$, are placed in close physical proximity so as to reduce fixed-pattern noise. As is known in the art, close physical pairing will establish very similar threshold voltages and coupling stray signals for the elements. By utilizing a differential amplifier, this noise is easily cancelled from the signal. The differential amplifier is a voltage amplifier as opposed to the current integrator utilized in the prior art. The differential amplifier provides a voltage gain of $R_B R_A$.

Control and drive clocks must of course also be included in the circuit. These elements include means to generate a start pulse and a buffer therefor, the master clock and its buffer, and the chip enable circuit. As suggested by its designation, the start pulse initiates the scanning operation of the shift register while the master clock and its buffer provide the sequential enabling clocks for the shift register. The chip enable circuit is used to enable and disable the power to each sensing element and dummy element and also to the output amplifier. By using the chip enable circuit to provide power to only one sensor chip at a time, the overall power consumption of the circuit can be significantly reduced.

Figure 9:
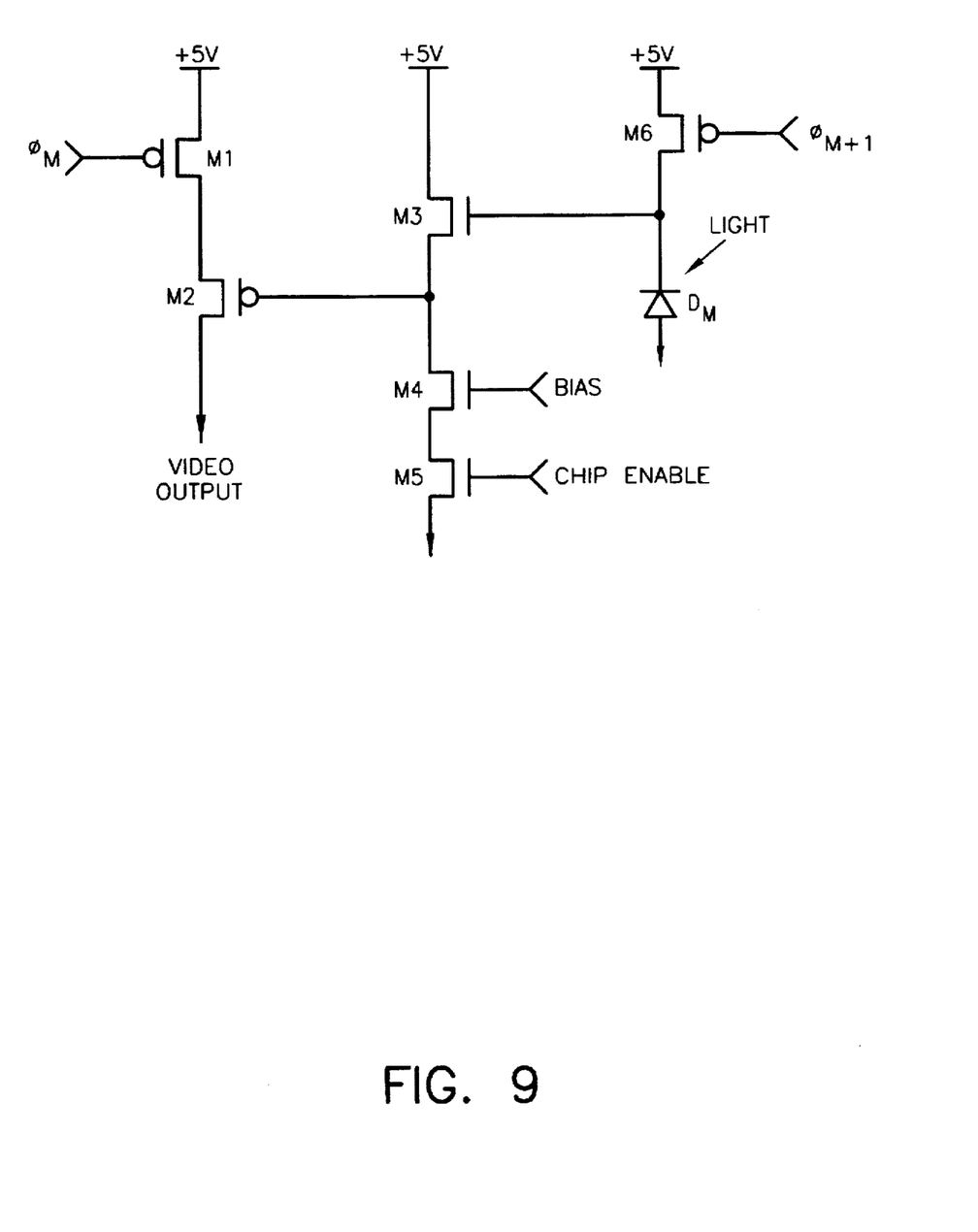
FIG. 9 shows a more detailed schematic of the sensing means of the present invention.

FIG. 9 shows a more detailed schematic of a sensing element of the present invention. The sensing element comprises as a chief component a pn junction photodiode $D_M$. The sensing means further comprises six active field effect transistors (FET's), designated M1 through M6. M1 is the readout multiplexer switch. M2 to M4 form a two-stage source follower that reads the voltage produced by the sensing diode $D_M$. M4, which is biased with an internally generated voltage, provides the load for the first-stage of the source follower. M5, which is driven by the chip enable pulse, turns off the current to the first-stage of the source follower when that particular sensor chip is not activated by the start pulse. M6 is the multiplexer switch which resets the photodiode to the dark level after it has output its signal.

If a user desires to scan color material, the circuit of the present invention can be so adapted. In the color application, three sets of active sensing elements are utilized; a first set including a red light filtering means, a second set including a green light filtering means, and a third set including a blue light filtering means. The signals from each of these three sets of active sensing elements is also compared to the signal from the dummy sensors, so that any noise in the output signal can be cancelled.

Operation of the individual sensors is as follows: a start pulse is received, thereby activating the chip enable circuit which turns on the M5 FET. This causes the photodiode signal voltage to appear on the gate of M2. The start pulse also initiates the scanning sequence of the shift register. The output of the shift register, represented by $\emptyset_M$, turns on M1 and allows the signal voltage to appear at the video output line for readout. When the shift register proceeds to the next pixel, that pixel's output, $\emptyset_{M+1}$, not only registers the reading for photodiode $D_{M+1}$, but also resets photodiode $D_M$ to +5 V (dark level) by activating M6 FET. This reset operation allows the photodiodes to begin integration for the next line to be scanned.

The integration time for one line is the time between two consecutive readouts for a given photodiode. During the integration time, the signal charge generated by the incident light will accumulate at the photodiode, lowering the photodiode voltage by an amount defined as $Q_S/C_D$, where $Q_S$ is the signal charge and $C_D$ is the capacitance of the photodiode. Since both $Q_S$ and $C_D$ are proportional to the photodiode area, the sensitivity of the photodiode detector is therefore independent of the detector area or size. This characteristic allows the use of very high density sensor chips without any sacrifice of system sensitivity.

FIG. 10 shows a series of sensor chips as they would be installed in the present invention. The number of photodetectors per chip and their center-to-center spacing are determined by the resolution required. For example, 200 dpi, 300 dpi, and 400 dpi resolutions respectively require 64, 96, and 128 photodetectors on a 8 mm long CIS sensor chip. The chips require pixel center-to-center spacing of 125 µm, 83.3 µm, and 62.5 µm for 200 dpi, 300 dpi, and 400 dpi resolutions respectively. The number of chips required is a function of the width of the scanning field desired (size of the document to be scanned).

Figure 11:
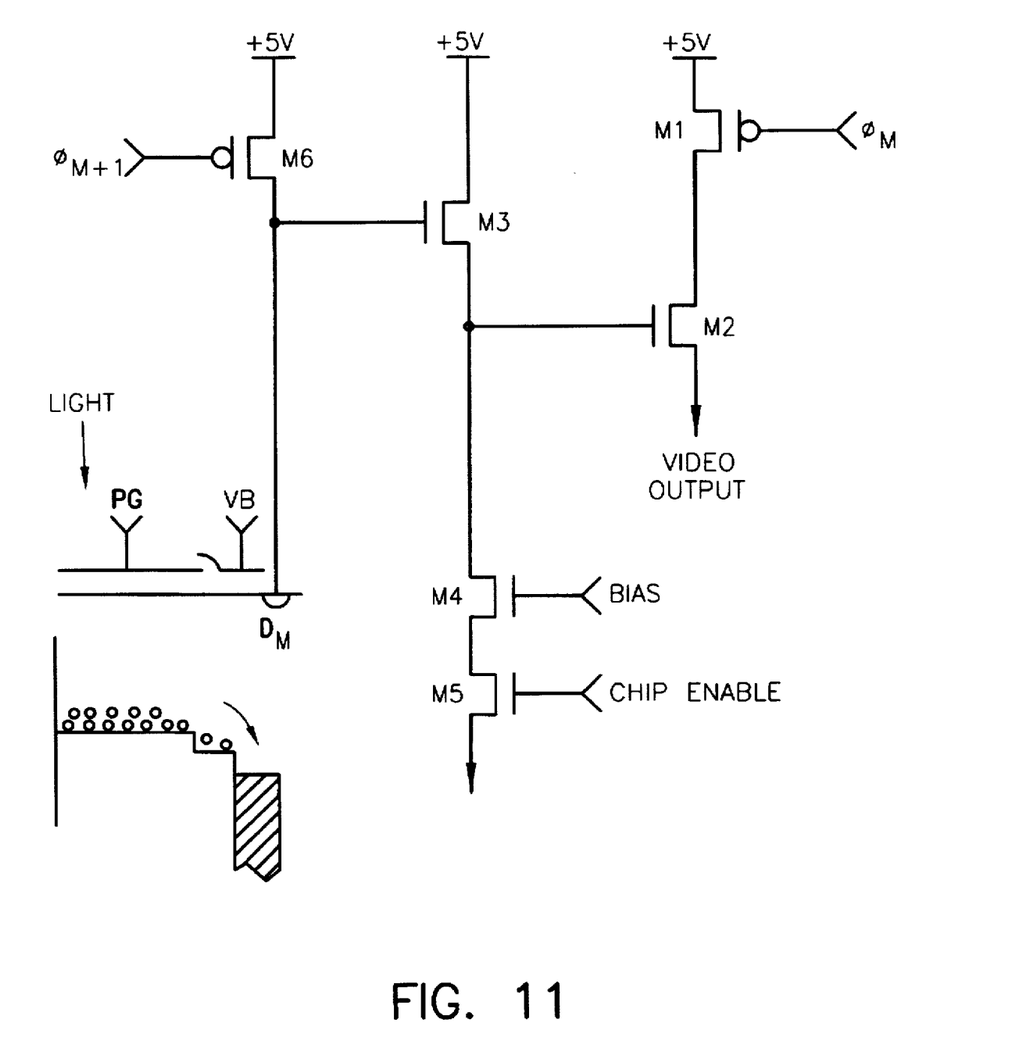
FIG. 11 is a schematic diagram of an alternate embodiment of the present invention.

FIG. 11 depicts a schematic diagram of an alternate embodiment of the present invention. PG is a MOS type photodetector, VB is a bias gate, and $D_M$ is the actual sensing node. VB is biased in such a way as to allow the signal charges collected at PG to flow into the sensing node $D_M$. The bias gate VB also separates the capacitance of $D_M$ sensing node from the capacitance of photodetector PG. Since the sensitivity of the sensor chip is proportional to $1/C_D$, where $C_D$ is the capacitance of the sensing node, and $C_D$ can be made very small, the sensitivity of the CIS chip can be improved significantly with this type of active sensing pixel. To improve the short wave length (blue) response, the MOS type photodetector PG can be replaced with a pinned photodiode. This type of voltage pickoff active sensor is referred to as a charge-transfer active sensor.

Figure 12A:
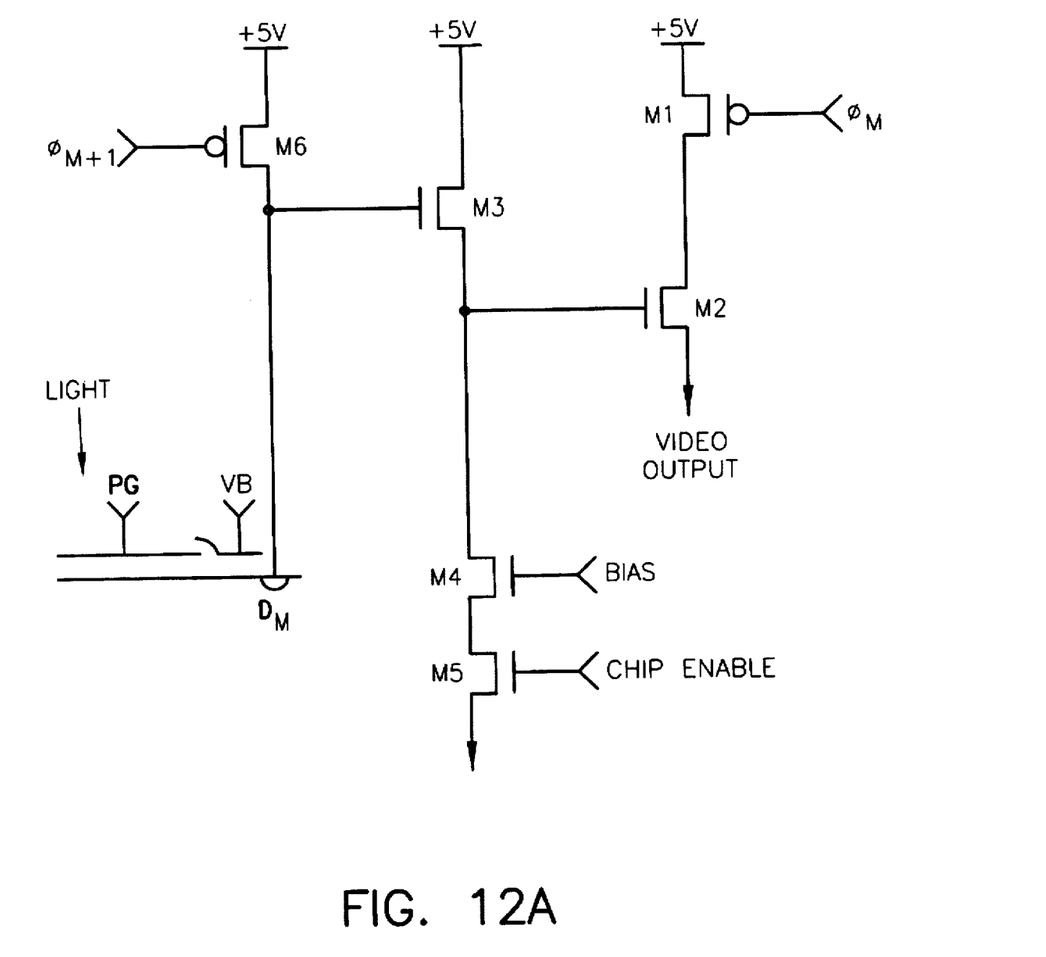
FIGS. 12A and 12B is a graphical depiction of an alternate operating scheme of the circuit depicted in FIG. 11.
Figure 12B:
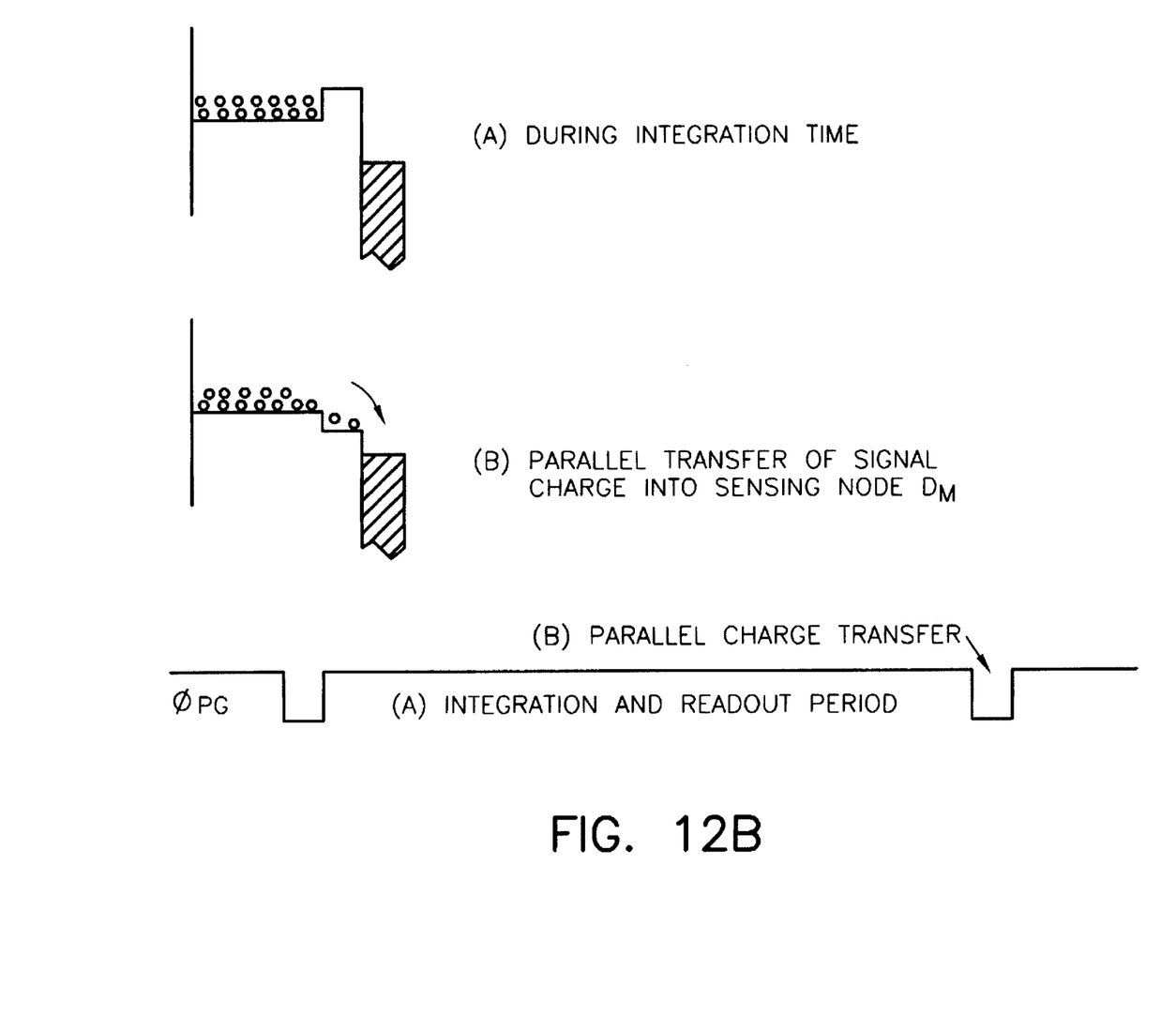

The voltage pickoff active sensor shown in FIG. 11 can also be utilized in a different mode of operation. As depicted in FIGS. 12A+12B, by biasing PG gate at high voltage during integration, the signal charge will accumulate underneath PG gate rather than flow into the storage capacitance of the sensing node $D_M$. When the sensor array is ready for readout, the PG gate is pulsed low to allow charges accumulated under PG gate to flow into sensing node $D_M$. The signal charge $Q_S$ will cause the sensing node voltage to drop by an amount equal to $Q_S/C_D$, where $C_D$ is the sensing node capacitance. While the sensing node voltage is being read out by the scanning shift register, the PG gate voltage can return to the high level for charge integration of the next line. The advantage of this parallel charge transfer mode of operation is that the integration times of each sensor in the array start and end at the same time. This mode of operation is essential in some application, such as when using a pulse light source rather than a continuous light source.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

We claim:

1. A contact image sensor circuit comprising:

a plurality of active sensing elements, a plurality of dummy sensing elements, each said dummy sensing element is placed in close proximity to a corresponding active sensing element, a shielding means to ensure that said dummy sensing elements receive no light exposure so that each dummy sensing element generates a reference output signal, control and drive clocks to control the timing and scan advance of the circuit, a digital scanning shift register, a first buffer amplifier and a second buffer amplifier; wherein said active sensing elements are activated in sequence by said shift register, each said active sensing element thereby generating an output signal that is received in said first buffer amplifier, as said shift register activates each succeeding active sensing element in sequence, said shift register resets each preceding active sensing element in sequence to a dark level, said dummy sensing elements are sequentially activated in the same manner as are said active sensing elements, said reference output signals of said dummy sensing elements are received in said second buffer amplifier, said output signals from said active sensing elements are compared to said reference output signals of said dummy Sensing elements to scrub said output signals from said active sensing elements of dark fixed pattern noise and DC offset voltage, thereby generating a resultant video output signal.

2. The circuit of claim 1 wherein:

said buffer amplifiers are voltage amplifiers.

3. The circuit of claim 1 wherein:

said sensing elements include pn junction photodiodes and active circuitry, and no npn phototransistors.

4. The circuit of claim 1 wherein:

said circuit further comprises a bias gate, said bias gate allowing signal charges to flow into a sensing node, said bias gate further separates a capacitance of said sensing node from the capacitance of a sensing element, thereby improving sensitivity of said circuit.

5. The circuit of claim 1 wherein:

said sensing element is a pinned photodiode.

6. The circuit of claim 1 wherein:

said sensing element is a photo gate.

7. The circuit of claim 1 wherein:

said digital scanning shift register includes a stage to accomplish the resetting of the preceding sensing element to the dark level.

8. The circuit of claim 1 wherein:

said circuit comprises a clocking bias gate, said clocking bias gate allowing accumulation of signal charge at the sensing element during integration and transferring of said accumulated signal charge into a sensing node before said shift register triggers a scanning operation of said sensor, thereby allowing the circuit to operate with a pulsed light source.

9. The circuit of claim 1 wherein:

said circuit comprises three sets of active sensing elements, a first set including a red light filtering means, a second set including a green light filtering means, and a third set including a blue light filtering means, thereby enabling the circuit to give color outputs using said reference signal generated by said dummy sensors to cancel noise from said outputs.

* * * * *